(No Model.)
H. S. MAXIM.
METHOD OF MAKING GUN COTTON.
No. 454,281. Patented June 16, 1891.
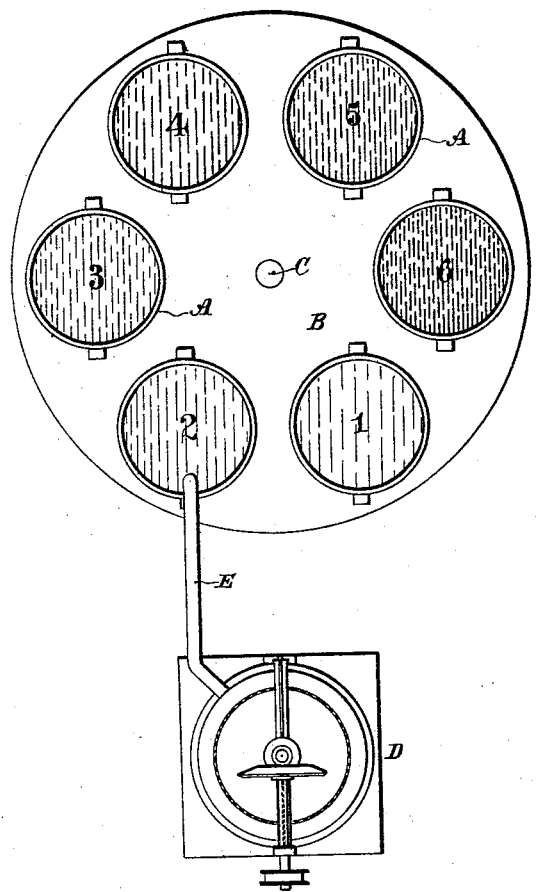
Centrifugal Separator
Witnesses:
Raphaël Netter
Ernest Hopkinson
Inventor
Hiram S Maxim
by
Duncan & Page,
Attorneys

UNITED STATES PATENT OFFICE.

HIRAM S. MAXIM, OF LONDON, ENGLAND.

METHOD OF MAKING GUN-COTTON.

SPECIFICATION forming part of Letters Patent No. 454,281, dated June 16, 1891.

Application filed September 29, 1890. Serial No. 366,460. (No specimens.)

*To all whom it may concern:*

Be it known that I, HIRAM S. MAXIM, a citizen of the United States, residing at London, England, have invented certain new and useful Improvements in Methods of Making Gun-Cotton, of which the following is a specification, reference being had to the drawings accompanying and forming a part of the same.

Gun-cotton or pyroxyline, as is well known, is usually prepared by immersing cotton or cellulose in a mixture of sulphuric and nitric acids, and then after its conversion removing by washing and other means all traces of the acids. It is a fact well known that to secure the best results and to effect the thorough nitration of the cotton after its first immersion in the acids and its partial conversion it should be subsequently dipped or steeped in acids as strong as it is possible to obtain. In the usual way of treating the cotton by repeated immersion in the same acids or by successive immersions in different receptacles no plan, so far as I am aware, has been proposed or pursued for economizing in the use of the acids, which are simply used to serve their purpose, and when weakened, but not entirely spent, are thrown away.

I have devised a method of preparing gun-cotton by which I render available all the valuable properties of the acids, and by which I am enabled to use such acids until they have become entirely spent, or until they have parted with nearly all their constituents that go to effect the nitration of the cotton.

This method involves the employment of a series of receptacles or vats A A, (shown in the top plan view of the apparatus which appears in the drawing,) which vats are filled with a mixture of the strongest acids procurable in the market. These vats I arrange on a table or platform B, mounted so as to turn about a central pivot or shaft C. For convenience I have designated these tanks by the numerals 1, 2, 3, 4, 5, and 6.

In using this apparatus in the manufacture of gun-cotton a given quantity of cotton is immersed, say, in vat 1. It is then removed and freed from the excess of acid by any suitable means, such as a centrifugal separator D. The acid separated from the cotton is returned to the vat from which it was taken. The cotton is then immersed in vat 2 and again freed from the absorbed acids by the separator, the table B, prior to such separation, being turned so that the acid from the discharge E of the separator will be delivered to vat 2 from whence it came. In the same manner the cotton is dipped in succession in each vat and the surplus acid squeezed from it back into its appropriate tank. After successive charges of cotton have thus been treated the acid becomes weakened or spent, that in the first vat of the series to the greatest degree and in each succeeding vat to a less extent. As long, however, as the strength of acid in the last vat is sufficient to secure the desired result and there remains in the first vat sufficient strength to partially convert the cotton, no replenishing of the acid is necessary; but as soon as the acid in the first or last vat of the series falls below the required strength the spent acid from vat 1 is replaced by fresh strong acid. Thus, in the order of the strength of acid contained in them, vat 2 now becomes the first of the series, or that containing the weakest acid, and vat 1 the last of the series. The subsequent charges of cotton are then immersed in vat 2 first and in vat 1 last until the spent acid in vat 2 is replaced by fresh strong acid, when in its turn vat 3 becomes the first of the series, and so on. In this way all the suitable properties of the acid are utilized, the weakest acids becoming weaker by the partial conversion of the cotton which they affect, while the last immersions of each charge of cotton are in the strongest acid.

The invention is not limited to the special apparatus employed. I have shown a conventional form of centrifugal separator; but any suitable means may be employed for expressing the acid from the cotton.

What I claim as my invention is—

1. The method of manufacturing gun-cotton, which consists in immersing or treating charges of cotton in a given order in each of a series of receptacles or vats of acid, and as the acid in said vats becomes spent or weakened replacing the weakest acid of the first vat of the series with fresh strong acid and changing the order of immersion or treatment of the succeeding charges of cotton in accordance with the relative strength of acid in the series of vats, as set forth.

2. The method of manufacturing gun-cotton, which consists in immersing or treating charges of cotton in a given order in each of a series of tanks or vats of acid and expressing from the cotton the excess of acid taken up by it and returning such excess to the vat from whence it was taken, then as the acid in said vats becomes spent or weakened replacing the weakest acid of the first vat of the series with fresh strong acid and changing the order of immersion or treatment of the succeeding charges of cotton in accordance with the relative strength of the acid in the series of vats, as set forth.

HIRAM S. MAXIM.

Witnesses:
PARKER W. PAGE,
M. G. TRACY.